(12) United States Patent
Morra et al.

(10) Patent No.: US 7,893,779 B2
(45) Date of Patent: Feb. 22, 2011

(54) MODULATED SUPPLY SPREAD SPECTRUM

(75) Inventors: Jim Morra, Cape Elizabeth, ME (US);
Seth Prentice, Auburn, ME (US)

(73) Assignee: Farichild Semiconductor Corporation, South Portland, ME (US)

(*) Notice: Subject to any disclaimer, the term of this patent is extended or adjusted under 35 U.S.C. 154(b) by 1 day.

(21) Appl. No.: 12/260,708

(22) Filed: Oct. 29, 2008

(65) Prior Publication Data

US 2010/0102847 A1 Apr. 29, 2010

(51) Int. Cl.
*H03B 29/00* (2006.01)
(52) U.S. Cl. .......................................... 331/78; 331/185
(58) Field of Classification Search ............... 331/34, 331/36 C, 46, 74, 75, 78, 177 R, 177 V, 185, 331/186
See application file for complete search history.

(56) References Cited

U.S. PATENT DOCUMENTS 4,507,796 A * 3/1985 Stumfall ...................... 375/376
7,254,157 B1 * 8/2007 Crotty et al. ................. 375/132

* cited by examiner

*Primary Examiner*—David Mis
(74) *Attorney, Agent, or Firm*—Cesari and McKenna, LLP; Edwin H. Paul

(57) ABSTRACT

A system reduces a received RF signal from EMI generated by a digital electronic system that includes a clock. In the present invention the clock frequency, that generates signals and strobes data out, is purposely changed or modulated, by, illustratively, driving the power node of the clock. The typical filter circuit between the clock power node and the power supply is used to advantage in that the filter impedance allows a buffer to more easily drive the clock power node since the low impedance of the power supply is isolated by the filter circuit. The changing of the clock frequency spreads the EMI RF harmonics over a spectrum so that any harmonics received by an RF receiver will be short lived and therefore of small magnitude.

8 Claims, 3 Drawing Sheets

MODULATED SUPPLY SPREAD SPECTRUM

BACKGROUND OF THE INVENTION

1. Field of the Invention

The present invention relates to suppressing noise in electronic circuits, especially in electronic communications circuitry, and more particularly to suppressing EMI (Electro-Magnet Interference) noise signals that propagate through the air.

2. Background Information

Noise in electronic circuits is described typically as propagating via common signal returns or ground paths, common power supplies, and EMI through the air.

Well known protective measures include: ground planes where signal returns have very low impedances resulting in little voltage noise; filters on power supply connections that impede signals from propagating between circuits via the power supply; and careful layout rules and shielding to reduce EMI. For EMI the prior art teaches shielding and laying out circuits and circuit modules so that mutual inductances, capacitive paths and EMI generation and reception are minimized.

In modern electronics, the electronic circuits are digital clocks (used herein synonymously with oscillators) and logic circuits that run computers and communications systems (PC's, hand held devices, etc.) at very high speeds. These high frequency signals also have sharp edges, and, together, create EMI noise that may exhibit RF (radio frequency) harmonics in the selectivity ranges of RF receivers with enough energy to adversely affect the RF receiver's performance.

FIG. 1 illustrates prior art circuit design of a CLK CKT (clock circuit) and a logic circuit, LOGIC CKT A, each with a separate filter to the power supply, $V_{DD}$, and a ground plane 2. These circuits represent virtually any electronic circuitry. $V_{DD}$ also has C1 and C2 bypass capacitors that present a low impedance to signal frequencies over a broad frequency spectrum. The separate filters each have a series inductor, L1 and L2, respectively, together with a bypass capacitor, C3 and C4, respectively, that filter signals traveling to or from the CLK CKT and the LOGIC CKT A via the $V_{DD}$ connection. EMI signals 5, however, may propagate via the air as shown whenever high speed frequencies or fast edges occur. These EMI signals may include RF harmonics that the RF antenna 4 will accept. These harmonics, received by the CKTRY B, increase noise and thus decrease the receiver's sensitivity.

In hand held electronics, shielding is often not a practical option, and layout considerations cannot eliminate EMI generation and their RF harmonics from coupling to RF receivers. Regardless of the care taken in the designs, such RF receivers suffer from increased noise and decreased sensitivity due to EMI.

SUMMARY OF THE INVENTION

The present invention addresses the coupling of EMI RF harmonics to RF receivers. The present invention, quite contrary to the isolation teachings of the prior art, actively modulates or changes the frequencies of clocks and clock related signals. Clock related signals include, inter alia, data that is strobed out with a clock. When a clock frequency changes, the harmonics of the clock are also changed or spread over a spectrum. In that manner, the magnitude of any harmonic of a clock that may be received by an antenna will be reduced as the harmonic frequency changes with the clock frequency. So rather than having a harmful constant frequency EMI RF harmonic received at an RF receiver, that harmonic magnitude will be reduced as the changing harmonic frequency removes itself from the antenna's selectivity range. Thus, the performance of the RF receiver is increased.

In another embodiment, changing the duty cycle of a clock may also spread the EMI RF harmonic content over a spectrum and thus reduce received EMI RF harmonics at an RF receiver.

The present invention provides several benefits that accrue from the inventive approach. One benefit is that few or no additional electronics or circuitry may be needed since a reference clock and logic drivers may already be present. Another benefit is that the passive filters between the power supply and the clock and other logic circuits may be used in a reverse manner (as described below) allowing the power node at the clock to be driven more easily. Some changing of the passive filter component values and connecting a buffer output to the clock circuit power node may be all that is necessary.

Illustratively, most clocks have frequencies that are, to some degree, dependent on the magnitude of the power connection to the oscillator. In one embodiment of the present invention, a buffer drives and changes the voltage at the power node of a clock at a frequency that may be derived from a reference clock (that is generated elsewhere in the system). This changes the clock frequency and, thus, spreads the EMI RF harmonics over a spectrum. Unexpectedly, the LC filters (FIG. 1 and FIG. 2A) provide an impedance that facilitates the voltage driving of the power node. In practice, the values of the LC and the driving function may de determined heuristically for given applications.

In one embodiment, a clock circuit comprises a ring oscillator. In such a circuit the frequency changes when the power supply to the ring oscillator is changed. Other oscillators, for example: VCO (Voltage Controlled Oscillator) clocks and other clock circuits, are designed to be frequency independent of power supply variations. These clock circuits, however, are not completely independent from power supply variations and may still benefit from the present invention.

The VCO clock circuit of FIG. 2B provides a control terminal 20 where external capacitors may be connected to trim the frequency. A coupling, such as a capacitor or resistor divider (FIG. 2D), from the REF CLK through a buffer 25 to the control terminal 20 impresses a signal onto the control terminal 20 that changes the clock frequency. This may accomplish the same beneficial effect as driving the voltage node.

In yet another embodiment of the present invention, the duty cycle of a clock may be lengthened, where such a change also changes the EMI RF harmonic content.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EXAMPLE OF THE PRESENT INVENTION

Figure 1:
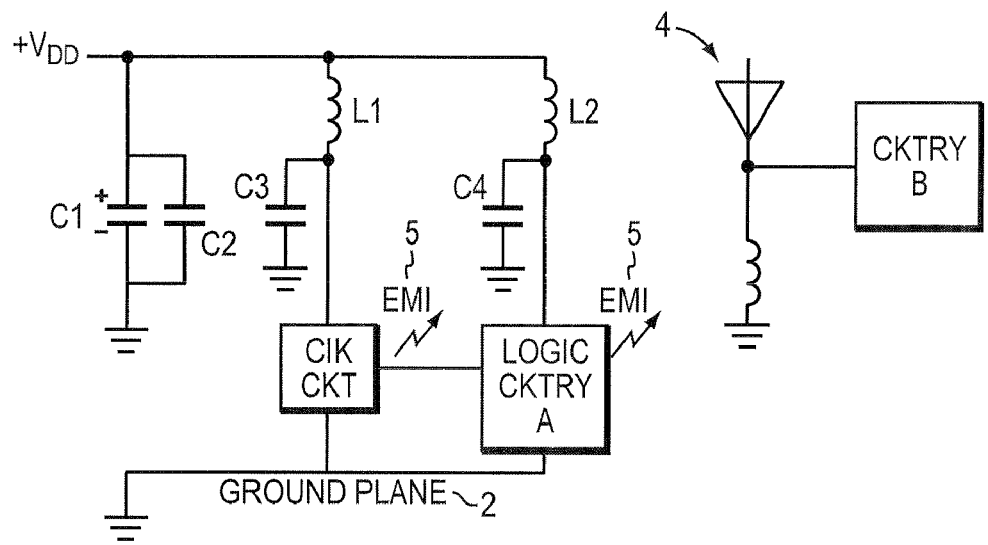
FIG. 1 is a circuit block diagram of prior art circuitry.
Figure 2A:
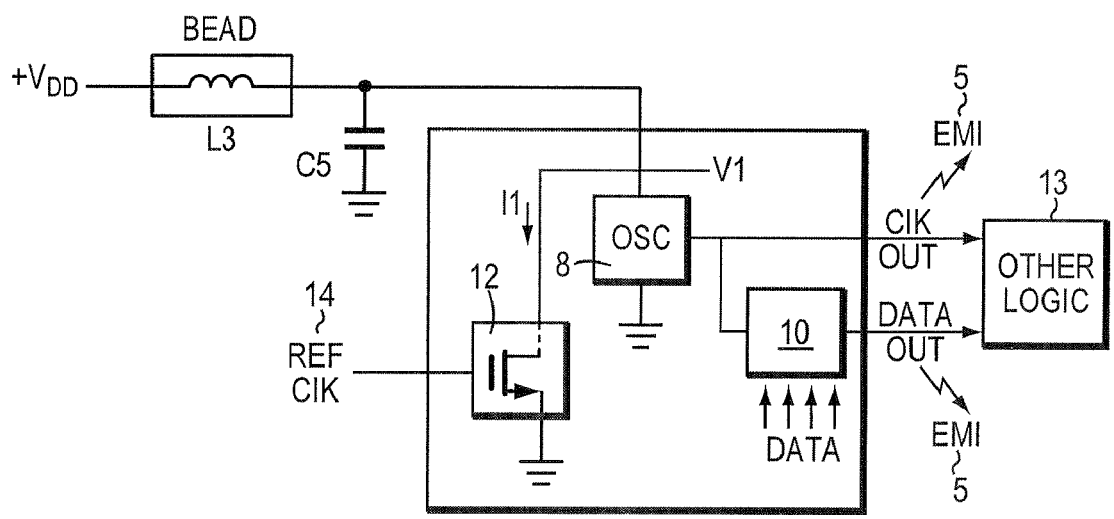
FIGS. 2A, 2B, 2C and 2D are circuit block diagrams illustrating embodiments of the present invention.

FIG. 2A illustrates a logic circuit powered from a DC power supply VDD. The VDD line is filtered by an inductor L3 and a capacitor C5. Often L3 includes a ferrite bead surrounding the voltage connection. Such beads are known in the art. An oscillator, OSC 8, is connected between the filtered power node V1 and ground. In this case the OSC 8 produces a clock, CLK OUT, that drives other logic 13. The OSC 8 also strobes out data, one data bit at a time, from the shift register 10. Both the CLK OUT and the DATA OUT will share common timing, both may have fast edges, and both may be sources of EMI 5.

FIG. 2A also has a REF CLK 14 that drives a buffer 12. The buffer 12 sinks a current I1 from V1 that changes the voltage value of V1 and, thus, the frequency of CLK OUT. Changing the frequency spreads the EMI 5 and its harmonics over a spectrum. Any RF receiver that might have received an RF harmonic from the EMI 5 will receive a lower magnitude due to the spectrum spreading.

Figure 2B:
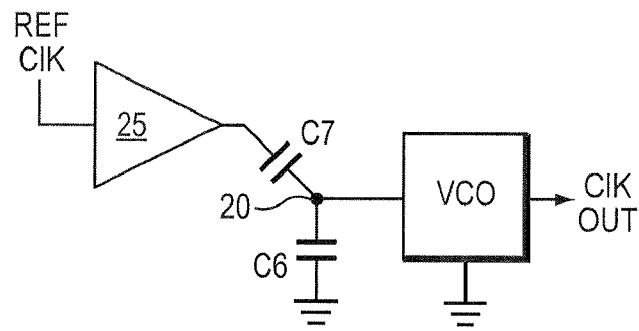

FIG. 2B illustrates another embodiment of the present invention. Here the oscillator is a VCO with a node 20 designed for an external frequency setting capacitor C6. As illustrated, the REF CLK may be buffered 25 and coupled to the node 20 via a capacitor C7 that is sized to produce a voltage signal at node 20. This voltage signal will usually modulate the VCO output frequency in a fashion similar to that of driving the power node V1 of FIG. 2A.

Figure 3:
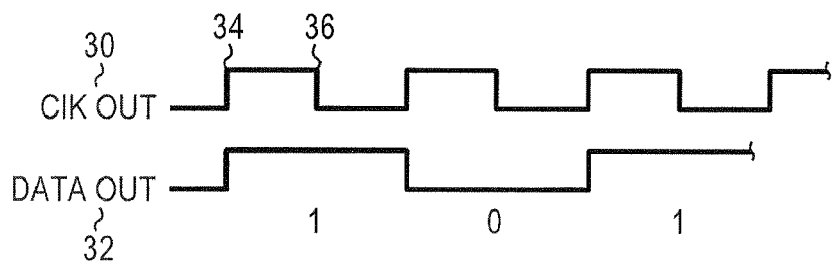
FIG. 3 is a timing diagram.

FIG. 3 illustrates a timing diagram of CLK OUT and DATA OUT from the circuit of FIG. 2A. Here the CLK OUT 30 strobes out the data, DATA OUT 32, from shift register 10 with the leading edge 34 of the CLK OUT signal. The trailing edge 36 of CLK OUT may be used by the receiver to strobe in the received data signals. It is clear that the timing of CLK OUT 30 and DATA OUT 32 share some common timing.

Figure 2D:
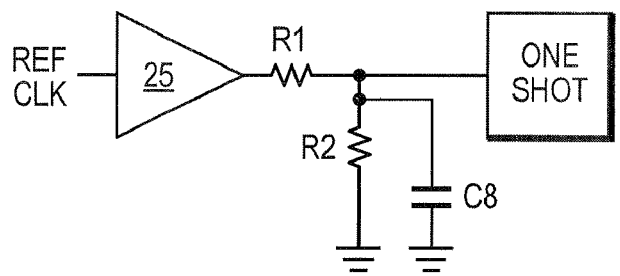
Figure 2C:
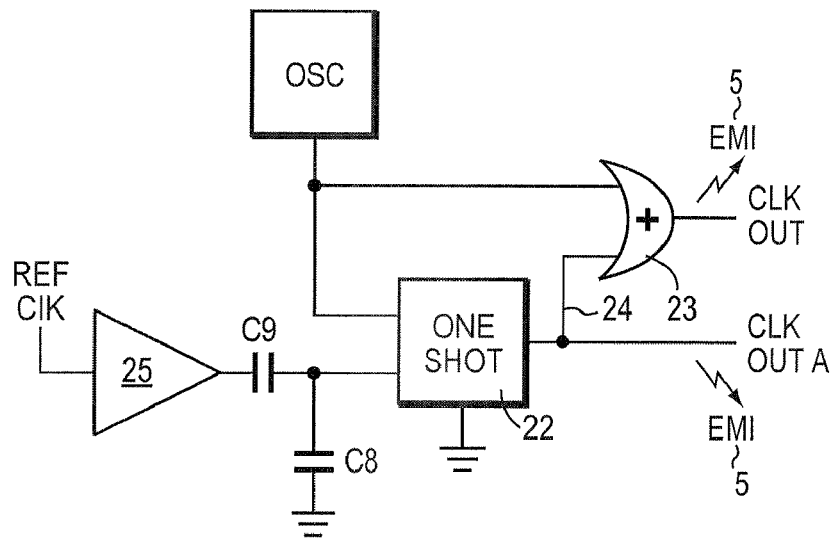

In another embodiment, of FIG. 2C, a one-shot 22 creates a pulse 24. A capacitor C8 determines the pulse width by voltage on the capacitor C8 rising until it triggers a comparator (not shown). In FIG. 2C, REF CLK is buffered 25, it is not synchronized to the OSC frequency, and it is of a frequency that is near or slower than the OSC frequency. The coupling through C9 will be random and the pulse width CLK OUT A 24 will be random. The random pulse width output of the one shot CLK OUT A could be used for the clock for the other circuit where it would generate EMI 5, as illustrated before. The CLK OUT A, however, could be fed to the OR circuit 23 to produce the CLK OUT. The output of the OR circuit 23 will be the longer of the OSC output signal or the one shot pulse. The changing pulse width changes the duty cycle, and, thus, the harmonic content of the EMI 5 is changed. FIG. 2D illustrates the circuit of FIG. 2C except a resistor divider of R1 and R2 couples the buffered 25 REF CLK to the one shot timing capacitor C8, that produces a random one shot pulse width at CLK OUT A 24.

Figure 4:
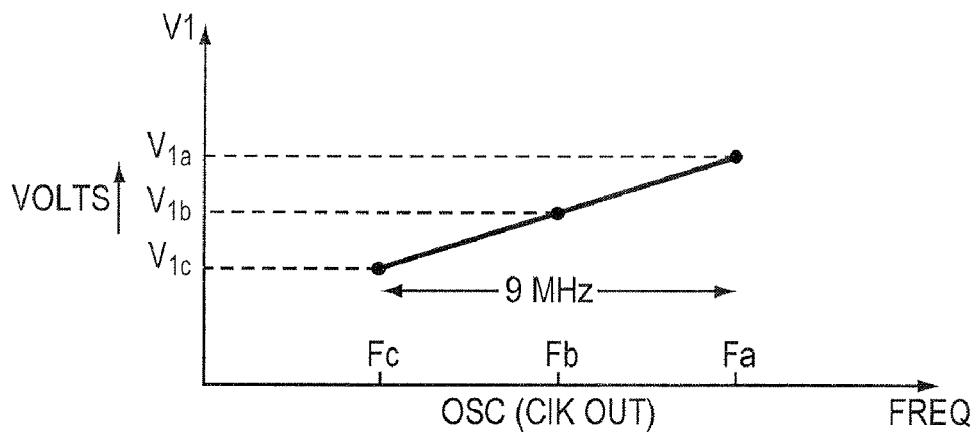
FIG. 4 is a graph representation of the modulating of the clock frequency by changing the supply voltage to a clock circuit.

FIG. 4 illustrates the effect, in FIG. 2A, of changing V1 from V1a, to V1b to V1c, where the OSC frequency changes from Fa, to Fb, to Fc, respectively. In one example, referenced below, the change from Fa to Fc is about 9 MHz, but the actual numbers may, as mentioned above, be determined heuristically for other applications.

Figure 5A:
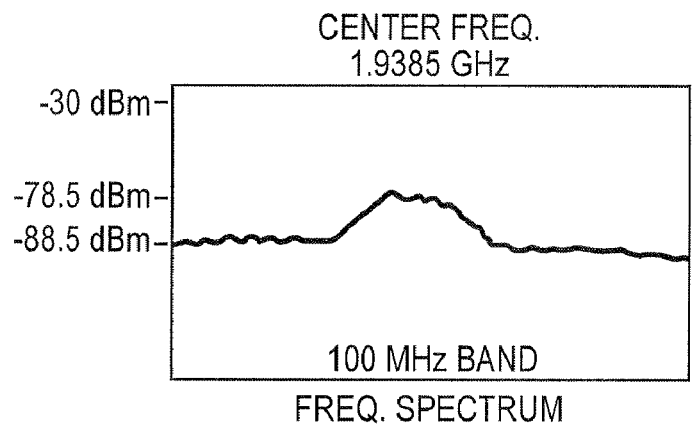
FIGS. 5A and 5B illustrate the reduction of EMI noise due to the present invention.
Figure 5B:
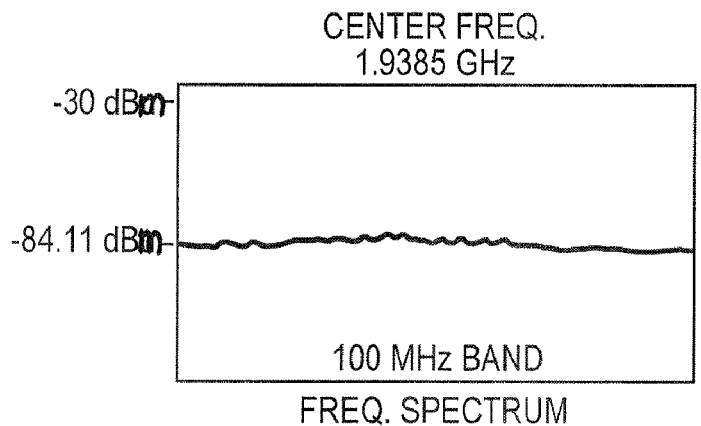

FIGS. 5A and 5B illustrate the beneficial effects of using the present invention. Here are traces of interference from EMI of a clock signal to an RF frequency, 1.9385 GHz, that is used in communications electronics. FIG. 5A shows an interference signal of about 10 dBm magnitude from a constant frequency clock signal. The trace of FIG. 5A is a scanning of 100 MHz range around the center frequency. FIG. 5B illustrates the same when the clock frequency is spread over a spectrum, where there is no perceptible interference signal. In this case the buffered 25 REF CLK frequency signal at V1 on FIG. 2A was about 0.2 volts peak to peak, and the OSC frequency change (Fa to Fc in FIG. 4) was about 9 MHz.

It should be understood that above-described embodiments are being presented herein as examples and that many variations and alternatives thereof are possible. Accordingly, the present invention should be viewed broadly as being defined only as set forth in the hereinafter appended claims

What is claimed is:

1. Logic circuitry that spreads harmonic content of EMI signals over a spectrum, the logic circuitry comprising:
   an oscillator that produces a clock; the oscillator having a power node, wherein the oscillator frequency is related to the voltage level on the power node;
   a reference clock coupled to the power node, wherein the reference clock changes the voltage on the power node that changes the frequency of the oscillator, wherein changing the frequency of the oscillator spreads the harmonic content of the EMI signals over a spectrum.

2. The logic circuitry of claim 1 wherein the oscillator is a voltage controlled oscillator.

3. The logic circuitry of claim 2 wherein the voltage controlled oscillator provides a control node for an external capacitor wherein the voltage on the capacitor determines the voltage controlled oscillator frequency.

4. The logic circuitry of claim 1 further comprising a radio frequency receiver that receives the spread spectrum harmonic content of the EMI signals, wherein any harmonic signal within the selectivity of the radio frequency receiver has a reduced energy compared to the harmonic content of non-spread EMI signals.

5. Logic circuitry that spreads harmonic content of EMI signals over a spectrum, the logic circuitry comprising:
   an oscillator that produces a first clock;
   a one shot circuit with a control node, an input coupled to the first clock, and an output clock comprising a series of pulses in response to the first clock, wherein the voltage on the control node determines the width of the pulses, and the first clock determines the output clock frequency;
   a reference clock coupled to the control node, wherein the reference clock changes the voltage on the control node and the pulse widths, wherein changing the pulse width spreads the harmonic content of the EMI signals over a spectrum.

6. The logic circuitry of claim 5 further comprising:
   a capacitor divider or resistor divider coupling the reference clock to the control node.

7. The logic circuitry of claim 5 further comprising:
   a radio frequency receiver that receives the spread spectrum harmonic content of the EMI signals, wherein any harmonic signal within the selectivity of the radio frequency receiver has a reduced energy compared to the harmonic content of non-spread EMI signals.

8. A method for spreading the harmonic content of EMI signals over a spectrum, the method comprising the steps of:
   filtering the power supply to a power node on a clock; wherein the clock frequency is related to the voltage level on the power node;
   driving the power node from a reference clock that changes the voltage on the power node that changes the frequency of the clock, and wherein changing the frequency of the clock spreads over a spectrum the harmonic content of the EMI signals produced by the clock.

* * * * *